May 9, 1950                  E. JOSEPHY                  2,507,307

MENU CARD OR THE LIKE

Filed May 22, 1946                                            4 Sheets-Sheet 1

FIG. 1

NOTE: a = b

INVENTOR.

ERWIN JOSEPHY

BY George H Corey

ATTORNEY

May 9, 1950            E. JOSEPHY            2,507,307

MENU CARD OR THE LIKE

Filed May 22, 1946            4 Sheets-Sheet 2

FIG. 2

INVENTOR
ERWIN JOSEPHY
BY George H. Laorey
ATTORNEY

May 9, 1950  E. JOSEPHY  2,507,307
MENU CARD OR THE LIKE

Filed May 22, 1946  4 Sheets-Sheet 3

INVENTOR.
ERWIN JOSEPHY
BY George H. Leorey
ATTORNEY

May 9, 1950         E. JOSEPHY         2,507,307

MENU CARD OR THE LIKE

Filed May 22, 1946         4 Sheets-Sheet 4

INVENTOR.
ERWIN JOSEPHY
BY George H. Corey
ATTORNEY

Patented May 9, 1950

2,507,307

UNITED STATES PATENT OFFICE 2,507,307

MENU CARD OR THE LIKE

Erwin Josephy, Woodhaven, N. Y.

Application May 22, 1946, Serial No. 671,531

9 Claims. (Cl. 282—9)

The invention relates to menu cards or the like which serve also as a check for payment of the charge and more especially to such cards having the items of food or articles for sale printed on the face of the card together with the price of the respective items. The invention particularly relates to cards of this type which are provided with a detachable stub to be given to the guest, or purchaser, and showing the amount of the charge for the meal or other service or for articles purchased.

Menu cards have been proposed heretofore which serve also as a check in which each item of food on the menu is printed on the face of the card together with the respective prices, usually shown at the right hand of the item, and having at the left hand of these items a space in which the guest may make a mark to show the item selected. To calculate the charge for the meal the waiter or the steward ordinarily enters in a column provided at the right hand of the card the price of each item selected and then enters the total of these items at the foot of this column to show the total charge for the meal. In my prior Patent No. 1,566,019, December 15, 1925, there is disclosed a menu card having these general characteristics. It has been found in the use of menu cards and meal checks in which entry of the charge is made on the check in manuscript that the waiter or the steward or other person handling the money may dishonestly make an improper return of the moneys collected. In some cases this has been accomplished by the waiter submitting to the guest a check of higher amount which has already been paid by a previously served guest. Unless the guest takes care to check all the items indicated and the amount of the charge, he may pay the higher amount and the waiter or the steward may keep out the difference between this higher amount and the proper charge which he accounts for to the proprietor or management. The returns made to the proprietor or management may be correct in accordance with the charges written on the checks but the guest, of course, has been overcharged. In some cases the waiter may merely give verbally to the guest without submitting the check a charge which is higher than it should be. Collusion between the stewards or waiters or other people handling the money is also possible with resultant fraud upon the guest or the proprietor or management.

It has been proposed heretofore, with the intention of informing the guest as to the charge to be paid, that the steward or other authorized person shall give to the guest a stub removably attached to the check and showing the amount of the charge for the meal, suitably arranged indicia of dollar and cents amounts being printed on this stub and being punched to show the charge. While the invention has been that this punched amount shall correspond to the amount written in manuscript as the total of the charge as above described, it is apparent that merely punching a stub and handing it to the guest does not provide any unalterable record for the proprietor or management of the amount so punched since the guest is expected to take the stub with him. It, therefore, has been possible to make dishonest returns as above mentioned, even though such stubs are used, particularly if the stub is merely handed to the guest after being detached from the card showing the corresponding written amount, or if the amount is punched without making the written entry, this entry being falsely made thereafter as a lower amount by the waiter or steward. Such written amount may, however, have been made to agree with the total of the items selected, the stub having been punched at a higher amount. These and other possibilities of false entry and dishonest return are possible because there has been no convenient device provided heretofore for checking the correspondence of the amount punched in the stub with the total of the entries in manuscript which may be easily inspected by the guest and by the proprietor or management.

It is an object of the invention to provide a combined menu card and check or the like which will prevent or minimize the opportunity for dishonest return and false entry of the charge.

It is a further object of the invention to provide a menu card and check or the like in which by virtue of a mechanical arrangement of punch marks in the body of the check correspondence may be noted with a written total of the amount of the items selected.

It is another object of the invention to provide a menu card and check with a detachable stub to be punched with the amount of the charge and given to the guest in the body of which card punch marks will appear representing by their positions in the card and relative to each other the amount of the charge corresponding to the amount punched in the stub.

It is a further object of the invention to provide a combined menu card and check to which is attached a duplicate order sheet upon which the items selected will appear but without indication of the price thereof and without showing the total charge for the meal.

It is a feature of the invention that a combined menu card and check, having the menu printed thereon and preferably provided with spaces for indicating the items selected and preferably also having a column in which entry may be made in writing of the price of each item selected and the total charge for these items at the foot of this column, is provided with a detachable stub which is foldable along the lower edge of the body of the card upon the card. This stub is provided with a series of indicia or numerals representing integral dollar amounts and another series of indicia or numerals representing integral amounts in cents. The card is also provided with a space along the bottom edge, that is the edge at which the stub is to be severed from the card, which is substantially of the same size and shape as the space encompassing and occupied by the two series of indicia. The encompassing space of the indicia on the stub is located in relation to a line of perforations or scoring serving as the line of detachment so as to be symmetrical with the corresponding space on the card. Upon folding the stub upon the card the indicia thus become positioned along the corresponding space on the card either above the front face of the card or beneath the back face of the card depending upon the direction in which the stub is folded. When, as will be more apparent from the description of the drawings to follow, the stub in its folded position is punched in the spaces or blocks respectively occupied by the indicia to indicate on the stub an amount in dollars and cents representing the charge for the meal, these same punches will appear in the corresponding space adjacent the lower edge of the body of the card.

The locations of these punch marks in the corresponding space in the body of the card are significant, therefore, of the dollars and cents amounts which have been punched in the detachable stub. These locations may be identified by auxiliary means hereafter described. It is a feature, however, that these locations of the punched marks in the corresponding space adjacent the lower edge of the card are significant of the dollars and cents amounts of the charge for the meal by virtue of their relation to each other and to the edges of the card and to the boundaries of this corresponding space. The card, therefore, with its punched marks and preferably with the individual items priced in writing in the right hand column above referred to and totalled in writing at the foot of this column, may be used by the proprietor or the management for record purposes and for checking of the returns made by the waiters and steward. The guest, moreover, may readily check the punched amount on the stub which is handed to him with the punches in the body of the card by merely superimposing the stub, if it has been detached, upon the card in proper position with the severed edges coincident. The possibility of such comparison by the guest and the provision of an unalterable indication consistent with the amount paid by the guest affords a strong deterrent against incorrect or dishonest returns of the money received from the guests.

As will be apparent from the description of the drawings, the stubs carrying the dollars and cents indicia may be designed for attachment in several ways to the card so as to be foldable upon the face thereof or beneath the body of the card to provide the features which have been described above.

In order to avoid possible confusion of the record and also since it is unnecessary that the money amounts shall appear on the orders which are to go to the kitchen or to the buffet or the bar or other division of the commissary for filling the order to be served to the guest, the menu card may be provided with a duplicate sheet preferably foldably attached to the card, this duplicate sheet being printed with identical items to those on the menu card and positioned to register respectively beneath the latter when the duplicate sheet is in the folded position with a sheet of carbon paper therebetween. In place of the carbon paper, if desired, the back face of the card may be carbonized. The mark made on the card by the guest in selecting the items desired will appear upon the duplicate sheet and will serve to instruct the chef or buffet attendant or the bartender as to what items are desired. Since no prices appear on this duplicate sheet the spaces occupied thereby may be used for special instruction to the kitchen, buffet or bar, made by the steward or other authorized person. The arrangement of the items of food on the menu card may be such that those which are to be filled respectively from the kitchen, the buffet or bar appear in separate sections of the card and of the duplicate sheet. These sections in the duplicate sheet may be severed one from the other and from the card along perforation or scoring lines so that the separate sections may be taken by the waiter to the proper place for filling the order.

Other objects and features of the invention will appear from the following description of the drawings in which:

Fig. 1 is a front view of the combined menu card and check having a stub attached thereto, with the duplicate sheet in flat relation thereto before being folded beneath the card.

Fig. 2 is a view of the reverse side of the card and the duplicate sheet shown in Fig. 1.

Figure 3:
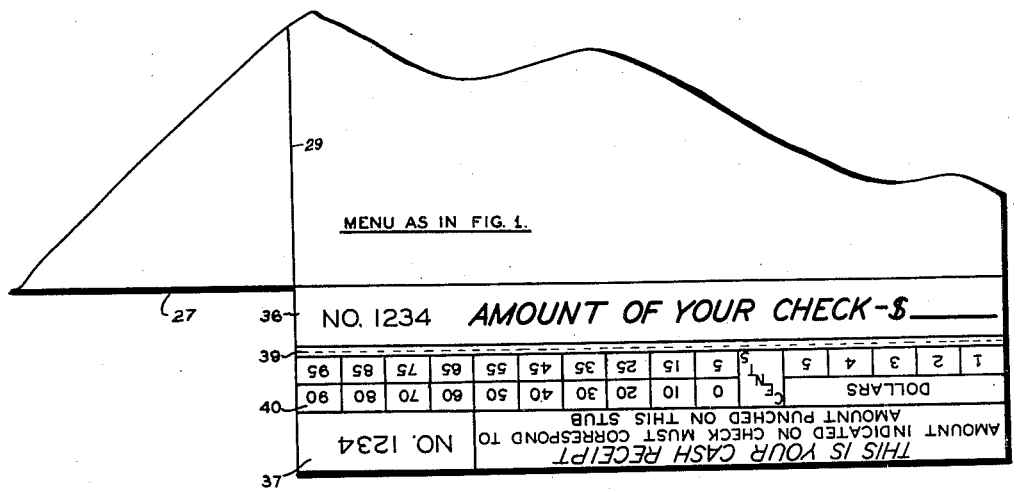
Fig. 3 is a front view of a portion of the menu card with a stub of modified form.

In Fig. 1 the menu card 1 having a vertical length represented by the dimension $d$ may be printed to show the various items of food and other articles for sale. The arrangement of this printed matter on the card is such that the upper four groups 3, 5, 7 and 9, including the table d'hote dinner, show items which are supplied from the kitchen. The next two groups 11 and 13, that is desserts, fruits, coffee, tea, etc., beneath this upper section show items which are sold from the buffet counter. The last two groups 15 and 17 show items which are sold from the bar. Except for the table d'hote dinner, against each item at the right hand thereof is indicated the price of the item of food or of the article. At the left hand of each item a space 19 is provided in which a check mark may be made by the guest in selecting the items which he wishes to have served to him. At the right hand edge of this card is provided the usual column 21 in which may be entered adjacent each group the amount of the item selected so that the total of these items so entered in this column may be made and may be entered in a space 23 at the foot of this column identified as "Amount of your check $_____$."

The portion 25 within the outline extending at the left of the menu card in Fig. 1 and having the vertical dimension $d$ represents the back of the duplicate sheet 27 which is foldable beneath the card and preferably is detachable along or adjacent the vertical left hand edge 29 of the menu card. The horizontal width of this sheet 27 in the embodiment of Fig. 1 is substantially of the dimension of the space containing the listed items and excluding the space occupied by the vertical column 21 adjacent the right hand edge of the card. As shown in Fig. 2, this duplicate sheet 27 is printed with the same items of food and articles and in the same arrangement as carried on the face of the menu card, the prices, however, being omitted therefrom. In the embodiment of Figs. 1 and 2 the back face 30 of the menu card 1 is carbonized in the portion within the outline 31 coextensive with the space occupied by the aggregate of groups 3, 5, 7, 9, 11, 13, 15 and 17. The width of this carbonized space also corresponds to the width of the menu card excluding the column 21. When, therefore, the menu card is in folded relation to the duplicate sheet 27 an item marked by the guest in a space 19 on the front face of the menu card will also be marked in the corresponding space 33 of the duplicate sheet, the items and the spaces for marking being so printed as to be in superimposed relation when the duplicate is in the folded relation to the card. By omission of the prices from the duplicate sheet the spaces 35 may be used for notes by the steward or others for instruction of the kitchen, the buffet counter or the bar. It will be noted that entries in the column 21 as well as in the space 23 for the total of these entries will not appear on the duplicate sheet 27 since this portion of the menu card extends beyond the right hand edge of the duplicate sheet 27 when the card and sheet are in folded relation.

Along the lower portion of the menu card below the portion thereof having the vertical dimension $d$ is provided a space 36 having a vertical dimension $a$, Figs. 1 and 2, and a width equal to the full width of the card. This portion of the card, therefore, extends below the lower edge of the duplicate sheet 27 when this duplicate sheet is in folded relation to the menu card. This space 36 corresponds to the space to be described on the detachable stub 37 in which the amount of the charge is to be punched. The stub 37 is severable from the menu card along the line 39 which may be provided by perforations or scoring or other suitable means to facilitate bending and tearing the stub from the body of the menu card.

In the embodiment of Fig. 1 within the space 40 having the vertical dimension $b$, indicia are printed in respective blocks representing dollars and cents amounts of the total of the charge which is entered in the space 23. In the embodiment of Fig. 1 the dollars are indicated by the numerals 1 to 5 inclusive at the upper left hand portion of the stub 37. The cents are indicated in a series of groups each having two blocks, one above the other, with the amounts increasing in five cent steps proceeding downwardly in each column of blocks and successively toward the right through the adjacent columns to a total of ninety-five cents. When the stub is folded along the lines 39 beneath the body of the menu card 1, it will be apparent, since the vertical dimension $b$ is made equal to the vertical dimension $a$ that the indicia carried by the stub 37 will become positioned beneath the space 36. The card then may be punched in the block showing the even dollars of the amount written in the space 23 and also in the block showing the corresponding cents of this amount. Since the space 40 is in superposed relation to the space 36 the punchings of these dollars and cents amounts on the stub will also be made in the space 36 of the body of the menu card 1.

In the particular embodiment of Fig. 1 the stub may be folded beneath the card and then the menu card may be turned over so that the bottom edge 39 thereof is uppermost. The punch then may be operated from this upper edge, the indicia on the stub being in upright position. The punches in the space 36, it will be understood, will have a definite relation both as to their position vertically in the space 36 and as to their position in the direction from left to right which is indicative of the value which has been punched as determined by the punching of the indicia in the respective blocks on the stub. This will be the case without any identifying indicia or numerals being printed on the face of the menu card 1 in the space 36. Since the portion of the card carrying the space 36 extends below the duplicate sheet 27 in folded position these punches are not made in the duplicate sheet. When the stub is severed or torn from the menu card along the line 39 it may be handed to the guest. The record of the punching, however, will remain in the body of the card, that is in the portion carrying the space 36. This record being of unalterable character, will show exactly the amount presented to the guest for payment. Since the punching must be effected prior to removal of the stub from the card in order that the punches shall appear properly on the card, the guest has the opportunity to make the comparison between the punched marks and the amount written in the space 23 at the foot of the column 21. Even though he does not make this comparison and pays the amount of the charge as indicated by the punched numerals in the stub it will be apparent that this unalterable record carried by the card may be used by the proprietor or the management to insure that the money received from the guest is returned and accounted for by the waiter and the steward.

Figure 4:
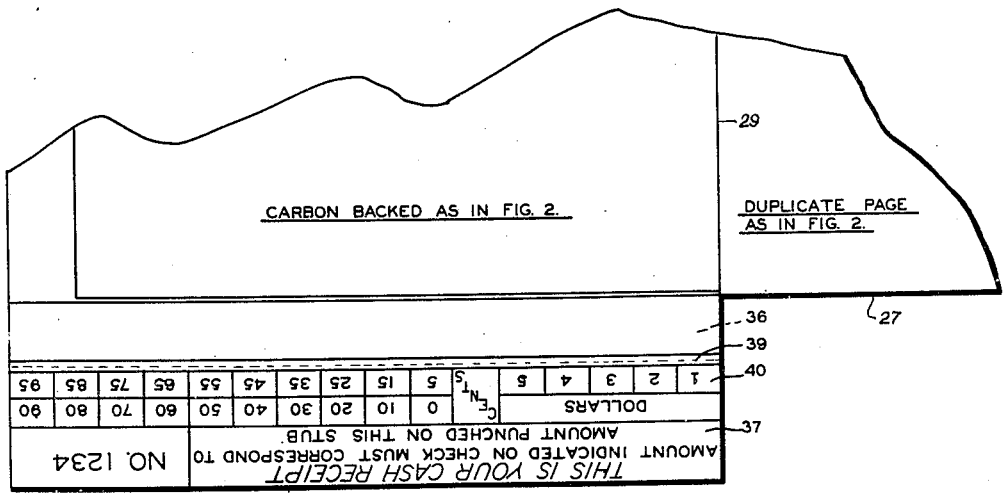
Fig. 4 is a view of the reverse side of the menu card with the stub shown in another modification thereof.

As shown in Figs. 1, 3 and 4 the space 36 may be used to carry the legend identifying the written amount of the check, the check serial number and other information if desired. The stub may carry the corresponding serial number and preferably the indication that the stub is a cash receipt as well as the statement that the amount indicated on the check, that is in the space 23, must correspond to the amount punched on the stub. Even though some of this printed matter including part of the written total is punched out, the punched record still remains and can be checked to a total newly made by the proprietor of the amounts of the items checked by the guest.

As shown in Fig. 2, the duplicate sheet 27 is divided into groups 43, 45, 47, 49 which are registerable respectively beneath the groups 3, 5, 7 and 9, these groups being those which contain items to be ordered from the kitchen. The groups 51 and 53 corresponding respectively to the groups 11 and 13 of items which are to be ordered from the buffet counter are carried at the central portion of the duplicate sheet 27, this portion being separable from the portion carrying the kitchen order along the perforated or scored line 59. The bottom portion of the duplicate sheet 27, which carries the groups 55 and 57 corresponding respectively to the groups 15 and 17 and include items to be ordered from the bar, is separable from the central portion along the line 61. These portions of the duplicate sheet each may be severed from the menu card along the line 62 of the folded edge between the card and the duplicate sheet or a perforated or scored line adjacent this folded edge may be provided for this purpose. These separated portions of the duplicate sheet 27 may then be sent to the respective divisions of the commissary for filling the order as indicated by the check mark in the space at the left of each item.

In Fig. 2 on the reverse side of the body of the card within the space 63 which has the vertical dimension a and which lies beneath the space 36 adjacent the bottom edge of the front face of the card, if desired, indicia or numerals indicating dollars and cents may be printed in the inverted relation there shown. Consideration of Figs. 1 and 2 in relation to each other will show that when the stub 37 is folded beneath the card, that is, upon the space 63 of Fig. 2 along the folding line 39, the indicia carried on the front face 37 will become superimposed upon the indicia printed in the space 63. Punching of the stub therefore as above described will produce punches in the corresponding blocks in the space 63 so that these punched spaces may be identified merely by inspection of the rear face of the menu card after the stub is severed therefrom. Although in most cases it may be preferred not to have indicia on the body of the menu card but rather to determine the value of the punch marks appearing therein after removal of the stub by virtue of the relative positions of these punch marks, the provision of the indicia printed in the manner shown in Fig. 2 is advantageous for readily reading the values indicated by the punches.

In Fig. 3 is shown another modification of the invention in which the indicia carried by the stub 37 in the space 40 thereof are in inverted relation to the line 39 of folding and separation of the stub from the body of the card. These indicia in this embodiment are printed on the face of the stub which is in the same plane as the front face of the menu card when the stub is in the flat relation before folding, as shown. It will be apparent that when the stub 37 in this embodiment is folded along the line 39 beneath the menu card the indicia in the space 40 will become positioned beneath the space 36 of the card in like manner to the indicia carried on the stub 37 in Fig. 1. These indicia, however, will be in the upright relation to the edge 39 when the menu card and the stub folded thereon are turned over toward the left. The indicia then may be punched from the bottom edge, that is the folded edge 39, with the indicia in such upright position without turning the menu card itself and the folded stub upside down, as is necessary in the embodiment in Fig. 1, in order to read the indicia right side up. In other respects the embodiment in Fig. 3 may be the same as that of Fig. 1, the items of the menu and articles for sale being printed in the same relation to the edges of the card and to the foldable duplicate sheet as above described.

In Fig. 4 is shown another modification in which the stub 37 carries upon the back face thereof the indicia in the space 40 in inverted relation to the folding line 39 so that these indicia become positioned above the space 36 on the card when the stub is folded upon the front face of the card. In Fig. 4, therefore, the printed indicia and other information is shown upon this face of the stub when the stub is in the flat relation to the card before folding, Fig. 4 being a back view of card. The legend "Amount of your check $_____" and the card serial number are printed on the front face of the card as in Figs. 1 and 3. When the stub 37 of Fig. 4 is folded upon the front face of the card it will be apparent that the indicia may be read in the upright position with respect to the folding edge 39 and the punch marks may be made in the stub and in the space 36 from this bottom edge without turning the card over. These punch marks are significant, by virtue of their position with respect to the left hand edge of the menu card at its front face and with respect to the lower edge thereof, of the punched indicia in the stub after it is removed and inverted for reading. In other respects the embodiment of Fig. 4 may be the same as that described in connection with Figs. 1 and 2.

Figure 5:
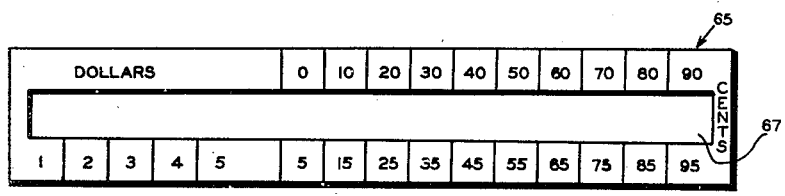
Fig. 5 shows an indicia determining device usable with the menu card and check of the invention.

In Fig. 5 is shown diagrammatically a device which may be made, for example, from a piece of stiff card or of plastic material for determining the value of the indicia punched in the space 36 of the menu card and check of Figs. 1, 3 and 4 when not printed with identifying blocks of indicia as shown in Fig. 2. The device comprises an elongated piece 65 preferably formed with a central elongated aperture or slot 67. The length of this slot is substantially that corresponding to the full width of space 36 on the menu card, that is the width of the space 40 of the stub 37. The height of the aperture 67 preferably substantially equals the height $a$ of the space 36 equal to the height $b$ of the space 40 which encompasses the blocks of indicia or numerals of dollars and cents. Along the lower edge of the space 67 at the left in the device 65 a series of blocks equal to the number provided for even dollar amounts are arranged and respectively identified with corresponding numerals. In the right hand portion alternately at the upper side and at the lower side of the aperture 67 blocks also are provided for the amounts in cents increasing in steps and in the groups as shown on the stub 37. It will be apparent that by bringing the aperture 67 into register with the space 40 on the stub the amounts of dollars and cents will correspond with those of the adjacently positioned blocks along the horizontally extending edges of the aperture 67. When now the device 65 is placed with the aperture 67 in register with the space 36 in the corresponding relation to that of the stub in its folded position, the values of the punched marks in the space 36 of the body of the menu card may be read from the device 65. By the use of the device 65 the printing of the indicia in the space 36, or on the reverse side of the card as shown in Fig. 2, becomes unnecessary, since by its use the values may be read directly, without interpretation by virtue of their relative positions, by placing the device 65 in the position described. In any case such a device may be used as a check for the proper interpretation of the value of the punched marks made in the body of the card within the space 36 as determined by these relative positions.

Figure 6:
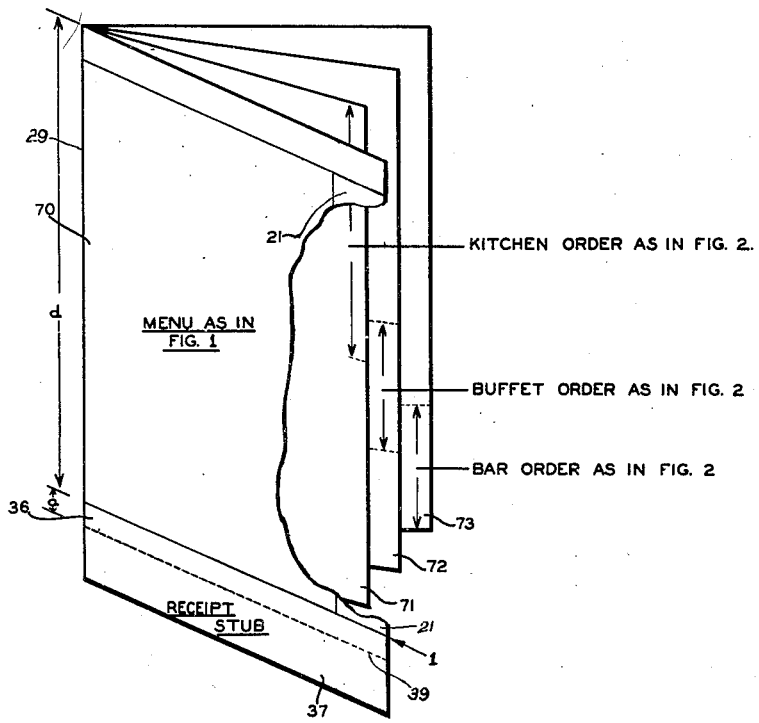
Fig. 6 shows the menu card and check of the invention utilizing a plurality of duplicate sheets.

In Fig. 6 the menu card 1 prepared in the manner disclosed in Fig. 1 may be provided with a stub 37 at the lower edge thereof which may have the characteristics of the stubs which are disclosed in Figs. 1, 3 or 4. The several features of the card and of the stub and their mutual cooperation which have been described above may be provided in the card 1 and the stub 37 of Fig. 6. In this embodiment of the invention instead of a single duplicate sheet 27 the card has detachably connected thereto adjacent the edge 70 a plurality of duplicate sheets 71, 72 and 73. The width of these duplicate sheets may be the same as that of the duplicate sheet 27 of Fig. 2 and substantially equal to the width of the menu card less the width of the column 21 thereof used for entry of the price for the items selected as above described. The length of the body of the card may be the vertical dimension $d$ occupied by the printed matter plus the dimension $a$ of the space 36 which is provided as in Figs. 1, 2, 3 and 4, adjacent the lower edge 39 of the body of the card at which edge the stub 37 is severably attached. The vertical length of each of the duplicate sheets 71, 72 and 73 may be the same as the dimension $d$. It will be apparent that if carbon paper is placed between the menu card 1 and the duplicate sheet 71 and similarly between the duplicate sheets 71, 72 and 73, the marks or checks which are made in the spaces 19 on the front face of the menu card, as in Fig. 1, will appear in the corresponding spaces 33, Fig. 2, on the duplicate sheets 71, 72 and 73. Moreover, no entries made in the column 21 will appear on the duplicate sheets 71, 72 and 73.

As indicated in Fig. 6, the upper portion of the duplicate sheet 71 corresponds to the section of the menu card which carries the items supplied from the kitchen. The middle section of the duplicate sheet 72 carries the items which are to be ordered at the buffet counter. The lowermost section of the duplicate sheet 73 carries the items which are to be ordered from the bar. Thus the marks which are made on the menu card, although they may appear on all three duplicate sheets 71, 72 and 73, are only of significance in connection with the printed items on the respective sheets 71, 72 and 73 on which the printed matter appears in the section in which the mark is made on the front face of the menu card 1. When, therefore, the sheets 71, 72 and 73 are served from the menu card along or adjacent to the edge 70, they may be separately delivered to the respective commissary divisions for filling the order. If desired, instead of the sheets 71, 72 and 73 being of full length equal to the vertical dimension $d$, they may be only of such vertical length and properly positioned vertically relative to each other that they will be in register with the respective sections containing the groups of items or articles to be supplied from the three different sections of the commissary above referred to. It, of course, will be apparent that instead of using carbon paper between the duplicate sheets 71, 72 and 73 these sheets each may be carbonized at their back faces for the same purpose.

It will be apparent from the above description that the combined menu card and check of the invention provides means for showing the items available for selection and the prices thereof, the items ordered and the amounts chargeable therefor and the total amount of the charge and that this record may be produced with a minimum of writing both on the part of the guest and of the waiter and steward. Moreover, it will be clear that the written prices of the individual items selected must agree with the printed price adjacent thereto. While it is advisable that the steward be required to write the price of each selected item in the column 21 and the total charge in the space 23 provided therefor, whether or not this is done the control is established by the necessity of simultaneously punching the amount of the charge both in the stub 37 to be handed to the guest and in the space 36 which is adjacent the lower edge of the card, that is the edge along which the stub is severed therefrom. Since the order originates with the guest and is determined by the marks which he makes in the spaces against the selected items, the ultimate total charge for the meal becomes determined by this selection and not by pricing done by the waiter or by the steward from a menu which is dissociated from the check which is intended to constitute the record of the sale of the meal or articles punched and for which the guest or purchaser is required to pay.

In that aspect of the invention which relates to the duplicate sheets the advantage is afforded that, by printing these duplicates in sections which are separable from each other along lines of perforation or scoring, each person in charge of a division of the commissary may receive and retain for record purposes the particular section of the order for the filling of which he is responsible. The proprietor or management in checking the items sold and issued by these divisions of the commissary against the supplies furnished to these divisions has available an accurate record of the quantity for each transaction or sale. This checking then can be done in much less time than is required in deciphering manuscript orders and in tabulating such orders for classification and totalizing.

Preferably erasure proof paper is used for both the menu card and check and for the duplicate sheets so that attempts to alter the written amounts to make them conform to amounts of money returned different from the amounts punched in the stub given to the guest will become evident. Attempts to make false returns by separately punching the stub and the space 36 on the menu card and check thereby will be made more difficult since the items entered in the column 21 must agree with the prices of the selected items and the total of the items in the column 21 must agree with the punched values in the space 36. Where the accounting is done in connection with a cash register provided with a device for printing the amounts, the items may be printed in column 21 or at least the total thereof may be printed by the checker on both the menu card and check in the space 23 and on a space provided therefor in the stub 37.

Other advantages of the invention will be apparent from a consideration of the disclosure and the invention may find application in various fields other than the sale of meals where it is feasible to present on a card or sheet a list of items for sale at predetermined prices and to have the purchaser indicate by a check mark the items selected and to pay the total charge therefor in accordance with indicia which are punched in a stub which is to be removed from the card and given to the purchaser but which before removal is foldable upon the body of the card so that the punch marks appear in a predetermined portion of this body and in a significant arrangement therein. Within the scope of the invention are included other modifications and applications than those disclosed and above described which are defined by the appended claims.

I claim:

1. The combination with a menu card or the like having thereon a list of food items and the respective prices thereof, and a space adjacent each item for marking the items selected, of a duplicate sheet foldably attached to said menu card, said duplicate sheet having thereon the list of food items corresponding to the food items on said card and having a space adjacent each food item corresponding to the spaces adjacent the respective items on said card for marking the items selected, said food items and said spaces on said duplicate sheet being positioned thereon to register substantially directly beneath the corresponding items and their respective spaces on said card when said duplicate sheet is in folded position, whereby a mark selecting an item made on said card will appear also on said duplicate sheet when a carbon paper or the like is inserted between said card and said sheet, said duplicate sheet being free of price indicia and the spaces on said duplicate sheet corresponding to the positions of the price indicia on said card being available for notes by the steward or waiter, said menu card having a receipt stub detachably connected to the body of the card at the lower edge thereof, said stub providing a series of indicia for different integral dollars amounts and another series of indicia of different amounts in cents, said card having a space on the front face of an undetachable portion of said body adjacent said lower edge of said body without corresponding dollars and cents indicia therein and of a shape and size corresponding to that encompassing all of said indicia of said stub, said stub being foldable upon said card along said lower edge of said card to register said encompassing space of said stub with said corresponding space on said body of said card, whereby punch marks placed in said stub at respective indicia to indicate the total amount in dollars and cents payable for the food selected also are made in said corresponding space adjacent the lower edge of said card and are significant of said total amount because of their position in said corresponding space, said duplicate sheet having the lower edge thereof spaced upwardly from said lower edge of said body of the card when said duplicate sheet is in folded position to leave said space on said card which corresponds to said encompassing space on said stub extending below the lower edge of said duplicate sheet, whereby punching of said duplicate sheet is prevented when said stub is punched in the folded position.

2. The combination with a menu card or the like as defined in claim 12 in which the food items on said menu card are arranged in a plurality of groups of different significance, said combination comprising a plurality of duplicate sheets each carrying the food items of one of said groups and omitting the food items of the other groups, the groups on the respective duplicate sheets being respectively registerable beneath the groups on said menu card, whereby when carbon papers or the like are placed respectively between said card and the several duplicate sheets food items selected by marking said menu card appear without price entries and only on the respective duplicate sheets for the groups in which said food items appear on the menu card.

3. The combination with a menu card or the like having thereon a list of food items, and a space adjacent each item for marking the items selected, of a duplicate sheet foldably attached to said menu card, said duplicate sheet having thereon the list of food items corresponding to the food items on said card and having a space adjacent each food item corresponding to the spaces adjacent the respective items on said card for marking the items selected, said food items on said menu card being arranged in groups on different adjacently arranged mutually undetachable portions thereof in accordance with the divisions of the commissary respectively supplying the items of said groups, said food items and said spaces on said duplicate sheet being arranged in corresponding groups and being positioned to register substantially directly beneath the corresponding items and their respective spaces of the respective groups on said card when said duplicate sheet is in folded position, said duplicate sheet being provided with means positioned between said groups for selectively detaching the portions thereof respectively carrying said groups, said duplicate sheet having the lower edge thereof spaced upwardly from the lower edge of said body of said card when said duplicate sheet is in the folded position to leave a space on said body extending below said lower edge of said duplicate sheet, said menu card having a receipt stub detachably connected to the body of said card at said lower edge thereof, said stub providing a series of indicia of different integral dollars amounts and another series of indicia of different amounts in cents, said stub being foldable upon said card along said lower edge of said body thereof so that the space on said stub encompassing said indicia becomes superimposed on the portion of the body of said card which extends below said lower edge of said duplicate sheet, whereby punch marks placed in dollars and cents indicia on said stub when said stub is in the folded position to indicate the total amount payable for food selected also are made in said portion of said body extending below said lower edge of said duplicate sheet.

4. The combination with a menu card or the like having thereon a list of food items and the respective prices thereof, and a space adjacent each item for marking the items selected, of a duplicate sheet foldably attached to said menu card, said duplicate sheet having thereon the list of food items corresponding to the food items on said card and having a space adjacent each food item corresponding to the spaces adjacent the respective items on said card for marking the items selected, said food items and said spaces on said duplicate sheet being positioned thereon to register substantially directly beneath the corresponding items and their respective spaces on said card when said duplicate sheet is in folded position, whereby a mark selecting an item made on said card will appear also on said duplicate sheet when a carbon paper or the like is inserted between said card and said sheet, said duplicate sheet having the lower edge thereof spaced upwardly from the lower edge of the body of said card when said duplicate sheet is in the folded position so that a portion of said body extends below said lower edge of said duplicate sheet, said menu card having a column along the right hand edge thereof for entry of the respective prices of the items selected and having a space at the foot of said column for the total of the prices entered in said column, said space for said total being located within said portion of said body of said card which extends below the lower edge of said duplicate sheet so that said total does not appear on said duplicate sheet.

5. The combination with a menu card or the like as defined in claim 4 in which said duplicate sheet is of less width than said card and is positioned with respect thereto when in folded relation thereto so that the portion of the card carrying said totaling column extends beyond the right hand edge of said duplicate sheet.

6. The combination with a menu card or the like as defined in claim 5 in which the food items on said card and correspondingly on said duplicate sheet are arranged in a plurality of groups of different significance, said duplicate sheet being provided with means positioned between said groups for selectively detaching the portions thereof respectively carrying said groups.

7. The combination with a menu card or the like as defined in claim 1 in which said menu card is provided with a column along the right hand edge thereof for entry of the respective prices of the items selected and has a space at the foot of said column for the total of the prices entered in said column, said space for said total being located within said space on the body of said card corresponding to said encompassing space on said stub.

8. The combination with a menu card or the like as defined in claim 1 in which said menu card is provided with a column along the right hand edge thereof for entry of the respective prices of the items selected and has a space at the foot of said column for the total of the prices entered in said column, said space for said total being located within said space on the body of said card corresponding to said encompassing space on said stub, said duplicate sheet being of less width than said card and being positioned with respect thereto when in folded relation thereto so that the portion of said card carrying said totaling column extends beyond the right hand edge of said duplicate sheet.

9. The combination with a menu card or the like as defined in claim 1 which comprises a plurality of duplicate sheets each having the lower edge thereof when in folded position spaced upwardly from the lower edge of the body of the card to leave said space on said card which corresponds to said encompassing space on said stub extending below the lower edges of all said duplicate sheets.

ERWIN JOSEPHY.

REFERENCES CITED

The following references are of record in the file of this patent:

UNITED STATES PATENTS

| Number | Name | Date |
| --- | --- | --- |
| 739,964 | White et al. | Sept. 29, 1903 |
| 972,549 | Lewis | Oct. 11, 1910 |
| 1,873,997 | Davis | Aug. 30, 1932 |
| 2,078,156 | Perry | Apr. 20, 1937 |
| 2,242,500 | Anderson | May 20, 1941 |

Certificate of Correction

Patent No. 2,507,307                                              May 9, 1950

ERWIN JOSEPHY

It is hereby certified that error appears in the printed specification of the above numbered patent requiring correction as follows:

Column 11, line 48, for the claim reference numeral "12" read *1*;

and that the said Letters Patent should be read with this correction therein that the same may conform to the record of the case in the Patent Office.

Signed and sealed this 18th day of July, A. D. 1950.

[SEAL]

JOE E. DANIELS,
*Assistant Commissioner of Patents.*